Sept. 11, 1934.          W. SCHAAKE          1,973,109
                        CURRENT COLLECTOR
                        Filed Oct. 13, 1931
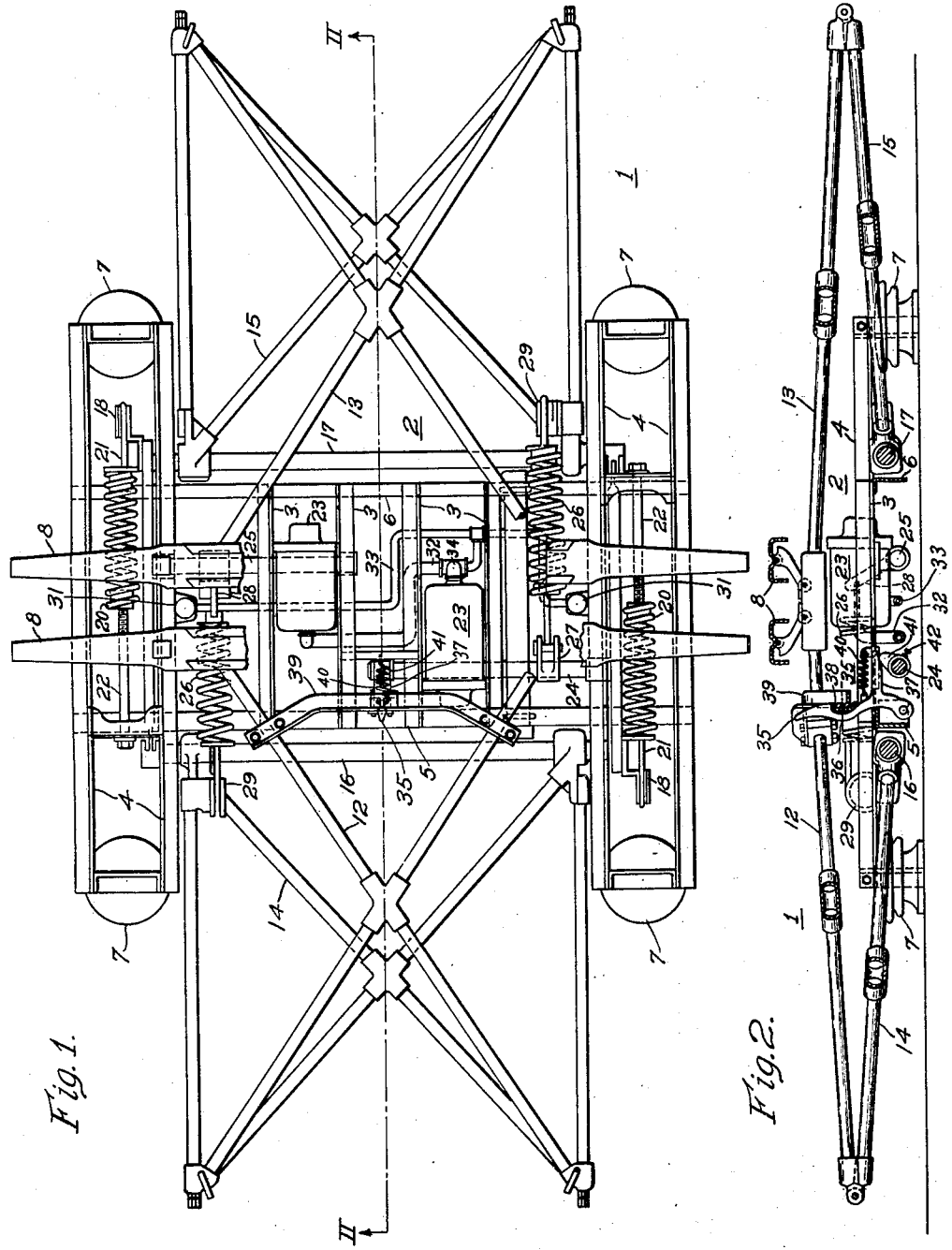
WITNESSES:                              INVENTOR
                                     William Schaake.
                                         BY
                                              ATTORNEY Patented Sept. 11, 1934

1,973,109

UNITED STATES PATENT OFFICE 1,973,109

CURRENT COLLECTOR

William Schaake, Pittsburgh, Pa., assignor to Westinghouse Electric & Manufacturing Company, a corporation of Pennsylvania Application October 13, 1931, Serial No. 568,565

7 Claims. (Cl. 191—67)

My invention relates, generally, to overhead current collectors for electric locomotives and it has particular relation to current collectors of the pantograph type which are pneumatically raised and maintained in the operating position.

In the customary type of pneumatically-raised current collector of the pantograph type, no provision was made for securing it in the extreme lowered position. Consequently, when the elevating force is removed, the current collector is free to move upwardly with slight restraint. In a current collector of the type in which the pantograph structure is spring balanced, the extent of the free upward movement may be considerable, since only a very small portion of the dead weight of the structure serves to bias it downwardly or toward the lowered position.

It is often desirable to operate an electric locomotive, on which a pantograph structure is mounted, with the current collector in the lowered position. Examples of operation with a lowered current collector may be found when locomotives are operated in multiple and the current for the entire train is collected by means of a single pantograph. When they are switched about the yard by a switching locomotive, the deenergized pantograph structures tend to bounce under these conditions because of unevenness in the track and, in addition, because of wind pressure that may be exerted on them.

It will be readily understood that the bouncing of the pantograph is extremely undesirable, since, in many instances, the overhead trolley conductor is located at a very short distance above the roof of the locomotive. The likelihood of the current collector coming in contact engagement with the overhead conductor is apparent, with the result that circuits within the locomotive may be inadvertently energized, thereby endangering any persons who may be stationed therein. In addition, the overhead conductor may be energized with a higher voltage than that with which the locomotive is designed to operate, or it may have other different characteristics, such as being of a different frequency, any of which might result in considerable damage to the equipment of, or personnel on, the locomotive in the event that the current collector is unexpectedly caused to engage the conductor.

Therefore, it is an object of my invention to provide a current collector for electric locomotives which shall be simple and efficient in operation, and readily and economically manufactured and installed.

A more specific object of my invention is to provide for maintaining a pneumatically-raised current collector of the pantograph type in a predetermined lowered position.

It is also an object of my invention to provide for automatically releasing a latching device in a pneumatically-raised current collector before the elevating force is applied thereto.

Other objects of my invention will, in part, be obvious and, in part, appear hereinafter.

My invention, accordingly, is disclosed in the embodiment hereof shown in the accompanying drawing, and comprises the features of construction, combination of elements and arrangement of parts which will be exemplified in the construction hereinafter set forth, and the scope of the application of which will be indicated in the appended claims.

For a more complete understanding of the nature and scope of my invention, reference may be had to the following detailed description taken in connection with the accompanying drawing, in which:

Figure 1 is a plan view, of a current collector of the pantograph type, constructed in accordance with this invention, certain parts having been broken away for the sake of clearness, and Fig. 2 is a sectional view, taken along the line II—II of Fig. 1, showing certain details of construction.

Referring now to the drawing, 1 designates, generally, a current collector of the type disclosed in Patent No. 1,528,079, issued to me March 3, 1925, and assigned to the Westinghouse Electric & Manufacturing Company. In order to support the current collector 1, a base, shown generally at 2, is provided which comprises a plurality of longitudinal angle members 3 and 4 that are secured together by means of transverse members 5 and 6. The angle members 4 are mounted on suitable insulators 7 which may be mounted on the roof of an electric locomotive.

In order to collect current from an overhead trolley conductor, a pair of slider shoes 8 are provided, which are disposed to be elevated into the operating position through the movement of a pantograph structure, shown generally at 11. The pantograph structure 11 embodies upper frame members 12 and 13 which are hinged to lower frame members 14 and 15, as shown in the drawing. The lower ends of the frame members 14 and 15 are mounted on and secured to shafts 16 and 17, respectively, to the opposite ends of which cams 18 are securely fastened. The dead weight of the pantograph structure 11 and the slider shoes 8 is partly compensated for by means of spiral springs 20 which are attached by means of suitable flexible connecting members 21 to the cams 18 and to the base 2 by means of bolts 22.

The elevating mechanism, the operation of which is more fully set forth in the patent hereinbefore mentioned, comprises pneumatic cylinders 23 which are provided with suitable pistons and connecting means for rotating control shafts 24 and 25. The force for elevating the current collector is transmitted thereto by means of additional spiral springs 26 which are connected at one end to clevises 27 and 28, secured to the shafts 24 and 25, and at the other end to cams 29 which are mounted on the lower frame members 14 and 15.

In addition to the main elevating mechanism, an auxiliary elevating mechanism is provided for quickly initiating the upward movement of the current collector. The auxiliary elevating mechanism comprises a pair of buffer cylinders 31 which are connected to a main air line 32 by means of an auxiliary air line 33. As described in the above-mentioned patent, a union connection 34 is provided between the main air line 32 and the auxiliary air line 33, in which a diaphragm, having a small aperture, is located. When air pressure is applied to the main air line 32, it will be apparent that there will be a slight retardation of its application to the buffer cylinders 31. As will be hereinafter set forth, this slight retardation produces certain conditions which are advantageous for the proper operation of the current collector during the elevating period.

In order to retain the current collector securely in the lowered position, a latch, shown generally at 35, is pivotally mounted on the transverse member 5 of the base 2. The latch 35 comprises a main body member 36 having an operating arm 37 projecting at right angles therefrom and a curved upper portion in which a reentrant opening 38 is located. A retaining member 39 is secured, as illustrated to the upper frame member 12 and is disposed to engage the latch 35 in the reentrant opening 38. It will be observed that the latch 35 is biased to the operative position by means of a spring 40 which serves to automatically actuate the latch into the locking position, when the retaining member 39 is in engagement therewith, as is shown in Fig. 2.

Since it is desirable to release the latch 35, when the current collector is to be raised, a cam 41 is provided on the shaft 24 and is disposed to rotate therewith for engaging the operating arm 37 for operating it to the unlocked position. It will be observed that a set screw 42 is provided in the cam 41 for securing it in any desired position on the shaft 24.

In operation, when air pressure is applied to the main air line 32, the shafts 24 and 25 are at once slightly rotated against the force of the springs 26. The tension of the springs 26, however, is so adjusted that the slight rotation of the shafts serves only to produce additional tension therein and does not apply an appreciable elevating force to the pantograph structure 11. The effect of the application of the air pressure to the auxiliary air line 33 and to the buffer cylinders 31 is likewise slightly retarded because of the small aperture in the diaphragm located in the union connection 34. It will thus be readily apparent that the latch 35 will be operated to the unlocked position before any appreciable elevating force is applied to the current collector 1 with the result that the current collector is free to rise, unhindered by a slow operation of the latching mechanism.

When the air pressure is removed, it will be observed that the current collector will collapse because of its own weight and, as a result, the retaining member 39 will engage the latch 35. This will serve to maintain the pantograph structure securely in the lowered position, thereby preventing any bouncing of the current collector and permitting the movement of the locomotive with its pantograph in this position without the likelihood of its engaging low hung overhead conductors.

Since certain further changes may be made in the above construction and different embodiments of the invention may be made without departing from the scope thereof, it is intended that all the matter contained in the above description or shown in the accompanying drawing shall be interpreted as illustrative and not in a limiting sense.

I claim as my invention:

1. In a pantograph trolley structure, the combination with an operating mechanism for raising said structure, of a latch for retaining the trolley structure in the lowered position, and means disposed to cooperate with said operating mechanism for releasing said latch prior to the application of the elevating force to the structure.

2. The combination with a pneumatically elevated current collector, of a latch for retaining the current collector in the lowered position, and means for automatically releasing said latch on the application of air for elevating said current collector.

3. In a pantograph trolley structure, in combination, an operating mechanism for raising said structure, a latch disposed to automatically cooperate with said structure for maintaining it in a lowered position, and means operated by said operating mechanism for releasing said latch before the elevating operation of said pantograph structure is initiated.

4. In a collapsible current collector for electric vehicles, in combination, pneumatic means disposed to elevate and maintain the current collector in engagement with an overhead trolley conductor, latching means disposed to be automatically operated on the lowering of said collector for retaining it in a predetermined lowered position, and means operated by said pneumatic means and rendered effective before the application of the elevating force to the current collector for releasing said latching means.

5. In a collapsible current collector, in combination, a base, a pair of pneumatic elevating mechanisms mounted on said base for raising and maintaining the current collector in engagement with an overhead trolley conductor, a retaining member mounted on said current collector, a latch pivotally mounted on said base and disposed to automatically engage said retaining member when the current collector is in a predetermined lowered position, and a cam disposed to be operated by one of said pneumatic elevating mechanisms for disengaging said latch from said retaining member to permit the releasing of the current collector before the elevating force is applied thereto.

6. In a current collector for electric vehicles, in combination, a base, a pantograph structure pivotally mounted on said base, pneumatic means for applying an elevating force to said pantograph structure, a pair of rotatable shafts for transmitting said elevating force, a pair of resilient members secured to said pantograph structure and to said shafts for transmitting the movement thereof to said pantograph structure, a retaining member secured to the upper portion of said pantograph structure, a latch pivotally mounted on said base and disposed to cooperate with said retaining member for maintaining the pantograph structure in a lowered position, a resilient member secured to said latch and to said base for biasing the former to a predetermined position and a cam secured to one of said shafts and disposed to operate said latch out of engagement with said retaining member before the elevating force is applied to the pantograph structure.

7. In a pantograph trolley structure, in combination, an operating mechanism for raising said structure, a latch disposed to automatically cooperate with said structure for maintaining it in a lowered position, and means operated by said mechanism and effective to release said latch before the elevating force is applied to said pantograph structure.

WILLIAM SCHAAKE.